Patented Jan. 16, 1940

2,187,597

UNITED STATES PATENT OFFICE 2,187,597

ANESTHETIC

James G. Blaso, East Elmhurst, Long Island, N. Y.

No Drawing. Application July 17, 1937, Serial No. 154,189. Renewed November 22, 1939

1 Claim. (Cl. 167—52)

The present invention relates to anesthetics and it particularly relates to local spray anesthetics.

Local anesthesia may be generally produced by various types of organic compounds, such as (1) those which cause anesthesia through the production of cold, as ether, ethyl chloride or methyl chloride; (2) certain protoplasmic poisons, such as quinine; and (3) those having a specific effect upon the sensory nerves or their endings, cocaine being of the type included in this last-mentioned class.

Though ethyl chloride a member of the first group is used to produce anesthesia by freezing, when applied as vaporized spray, or as a general anesthesia by inhalation, when used topically it is difficult to maintain a prolonged local anesthesia. Therefore ethyl chloride is primarily and extensively used for the induction of local anesthesia for short periods of time. On the other hand, members of the third group are only effective when applied in an aqueous or oil solution when applied topically or in sterile stabilized aqueous solution when injected subcutaneously.

It is among the objects of the present invention to provide a new topical and infiltration anesthetic capable of inducing effective, profound local anesthesia of prolonged duration.

Another object of the present invention is to provide a liquid spray anesthetic, suitable for topical and infiltration anesthesia, which will produce prompt, diffusible and profound anesthesia in the areas, to which it is applied.

A further object is to provide an improved anesthetic which will produce anesthesia most rapidly and with great speed when sprayed, and which will have high penetrating powers so as thoroughly to anesthetize the area to which it is applied.

Other objects of the present invention will be obvious or will appear during the course of the following specification:

It has been found that the above objects may be most readily accomplished by dissolving or combining relatively small quantities of certain active anesthetic compounds consisting of straight or ring compounds, including amino-aliphatic and aryl groups and also preferably acyl or ether groups. These active anesthetic principles or compounds are dissolved in a greater proportion of a mutual solvent or stabilizer, the preferred solvents or stabilizers being hydroxy-aromatic compounds.

This combination then of a minor proportion of the active anesthetic principle or compound and a major portion of the carrier or stabilizing hydroxy aromatic compound are then dissolved in or combined with a relatively volatile solvent, the preferred solvents being readily vaporizable alkyl esters.

Among the many anesthetic materials or compounds which may be utilized, either by themselves or in combination with each other or in combination with other anesthetics are the following:

"*Alypin*".—Alypin Hydrochloride.—The hydrochloride of 2-benzoxy-2-dimethylaminomethyl-1-dimethylaminobutane.

$CH_3CH_2C(C_6H_5COO)[CH_2N(CH_3)_2]$.
$CH_2N:(CH_3)_2.HCl$

"*Aposthesine*".—Aposthesine Hydrochloride.—Gamma diethyl-aminopropyl cinnamate hydrochloride.

$(C_2H_5)_2N.CH_2.CH_2CH_2COO.CH:CH.C_6H_5HCl$

The hydrochloride of a condensation product by the action of cinnamoyl chloride on gamma diethylaminopropylalcohol.

"*Butyn*". — Butyn Sulfate. — Para-aminobenzoyl - gamma-dinormalbutylaminopropanol sulfate. — gamma-dibutylaminopropyl-para-aminobenzoate-N-sulfate.

$[NH_2.C_6H_4.COO(CH_2)_3.N(C_4H_9)_2.]_2H_2SO_4$

Butyn is the normal sulfate of a base resembling the base of procaine hydrochloride (p-aminobenzoyl-diethylamino-ethanol hydrochloride); but it differs in that butyn possesses a butyl group in place of the ethyl group of procaine base, and a propanol group in place of the ethanol group.

"*Diothane Hydrochloride*."—Diothane.—Piperidinopropanediol-di-phenylurethane hydrochloride.

$C_5H_{10}N.CH_2CH(OCONHC_6H_5)CH_2$
$(OCONHC_6H_5).HCl$

The hydrochloride of the base piperidino-propanediol-di-phenylurethane, obtained by combining piperidine and glycerol monochlorohydrin in the presence of an alkali, and reacting the piperidinopropanediol with phenyl isocyanate.

"*Larocaine Hydrochloride*".—Para aminobenzoyl-2-2-dimethyl-3-diethylaminopropanol hydrochloride. — gamma-diethylamino-beta, beta dimethylpropyl-para-aminobenzoate hydrochloride.

$NH_2(C_6H_4CO)OCH_2C(CH_3)_2CH_2N(C_2H_5)_2HCl$

The base of larocaine belongs to the procaine type. It differs from procaine in having a propanol group instead of the ethanol group and has two methyl groups attached to the former.

"*Metycaine*".— Metycaine Hydrochloride.— Benzoyl-gamma-(2 methylpiperidino)-propanol hydrochloride.— gamma-(2 methylpiperidino)-propylbenzoate hydrochloride.

$$C_6H_4.COO(CH_2)_3.NC_6H_{12}.HCl$$

The base of metycaine differs from the base of procaine hydrochloride in having the basic nitrogen in a methylpiperidino ring instead of the dimethylamino, a propanol group in place of the ethanol group and in not having an amino group attached to the benzene ring. In addition, it possesses an asymmetric carbon atom, but it is optically active. Metycaine is therefore a racemic mixture of the hydrochlorides.

"*Nupercaine-Ciba*".—Nupercaine Hydrochloride.—Alpha-butylocycinchoninic acid, gamma-diethylethylenediamine hydrochloride.—2-butyl-ocyquinolinecarboxylic acid-4-diethylethylenediamide hydrochloride.

$$C_9H_5N.OC_4H_9(2).CONH(CH_2)_2N(C_2H_5)_2HCl(4)$$

The hydrochloride of the base alpha-butyloxycinchoninic acid gamma-diethylethylenediamide obtained by chlorination of alpha-chlor-cinchoninic acid chloride and conversion of the latter with asymmetric diethylethylenediamine into alpha-chlor-cinchoninic acid diethylethylenediamine and subsequent heating with sodium butylate. Nupercaine was introduced as percaine.

"*Orthoform*".—Orthoform-New.—Methylmeta-amino-p-oxybenzoate.—
$C_6H_3.NH_2OH.CO.O.(CH_3)$, 3:4:1.—The m-amino-p-oxybenzoic acid ester of methyl alcohol.

"*Phenacaine Hydrochloride*".—

$$CH_3C:(NC_6H_4OC_2H_5).(NH.C_6H_4OC_2H_5).HCl.H_2O$$

"The hydrochloride of ethenyl-p-diethoxydiphenylamidine."

"*Procaine Borate*".—1-amino-benzoyl-2-diethylamino ethanol-penta-m-borate; β-diethylamino-ethyl-p-amino-benzoate penta m-borate.

$$C_6H_4NH_2COO.C_2H_4N(C_2H_5)_2.5HBO_2$$

A borate formed by the interaction of p-aminobenzoyl-diethylamino-ethanol (procaine base) and boric acid in the same organic solvent. Procaine borate contains 51.8 per cent of p-aminobenzoyl-diethylaminoethanol.

"*Procaine Hydrochloride*".—Procaine.—"Para aminobenzoyl-diethylaminoethanol hydrochloride."

"*Tutocain*".—Tutocaine Hydrochloride.—Butamin.— p-Amino-benzoyldimethylaminoethyl-butanol hydrochloride.—gamma-dimethylamino-alpha, beta-dimethylpropyl-p-aminobenzoate hydrochloride.—p-aminobenzoyldimethylamino 1:2 dimethyl-propanol hydrochloride.

$$(CH_3)_2N.CH_2.CH(CH_3)CH(CH_3)$$
$$(O.CO.C_6H_4.NH_2)HCl$$

The base of tutocain belongs to the procaine type, but in addition possesses two asymmetric carbon atoms; it is optically active. Tutocain is therefore a racemic mixture of the hydrochlorides.

"*Ethyl Aminobenzoate*".—Anesthesin.—Benzocaine.

"*Butesin*".—n-butyl-p-aminobenzoate.

$$C_6H_4NH_2.COO(C_4H_9)$$

The normal butyl ester of 4-aminobenzoic acid, $C_6H_4NH_2.COOH$.

These active anesthetic compounds just mentioned then will dissolve preferably at least in equal proportion and preferable in twice or three times the proportions of benzyl alcohol.

This combination is then dissolved in a suitable alkyl or other aliphatic ester which is readily vaporizable, the preferred ester being ethyl chloride.

Other base fluids or vehicles may be employed having the same boiling point range, such as, for example, methyl chloride.

In general, however, the vehicle or base and the stabilizer or carrier should be so adjusted as to be readily miscible with each other in all proportions and it is apparent that many liquids and compounds of liquids may be utilized which would conform to these requirements.

Although many different proportions and compounds of ingredients may be utilized, the following have been found to be typical formulae which are most suitable and may be widely employed:

*Formula 1*

|  | Percent |
|---|---|
| Butyn | 5 |
| Benzyl alcohol | 10 |
| Ethyl chloride | 85 |

(All parts are by weight.)

*Formula 2*

|  | Percent |
|---|---|
| Orthoform | 2.5 |
| Butyn sulfate | 2.5 |
| Eugenol | 10 |
| Ethyl chloride | 85 |

(All parts by weight.)

*Formula 3*

|  | Percent |
|---|---|
| Procaine | 2.5 |
| Metycaine | 2.5 |
| Benzyl alcohol | 10 |
| Ethyl chloride | 85 |

(All parts are by weight.)

In preparing the foregoing liquid spray anesthetic, 5 grams of "Butyn" are dissolved in 10 grams of benzyl alcohol and this solution added to 85 grams of U. S. P. ethyl chloride and the mixture stirred or rapidly agitated and immediately measured and filled into dispensing containers. Though "Butyn" is somewhat soluble in ethyl chloride it is preferable to dissolve it first in the carrier or stabilizer, benzyl alcohol, which increases the solubility of the principal active ingredients and at the same time prevents clogging of the spray nozzle.

The anesthetic mixture so produced may be widely used as a liquid spray anesthetic for topical and infiltration anesthesia and it will produce prompt, diffusible and profound anesthesia upon various surfaces. When sprayed, it will produce anesthesia by rapid evaporation and diffusion of the solvent with the increase of pressure in the areas of application causing penetration of the active anesthetic agent.

The anesthetic prepared according to the above procedures is uniform, is clear in solution and does not decompose, discolor, or become turbid.

The carrier or stabilizer greatly increases the solubility of the active anesthetic ingredient and will act as a preventative for clogging of the spray nozzle.

The characteristic feature of the present invention resides in the provision of ethyl chloride as a carrier for an anesthetic, which ethyl chloride will produce a spray and also sufficient pressure at the point of application to assure penetration of the anesthetic. The ethyl chloride is not primarily used as an anesthetic in itself but solely as a carrier or solvent for the active anesthetic agent. Obviously other similar readily vaporizable organic solvents or carriers may be employed.

In respect to the benzyl alcohol, or other mutual solvent, this ingredient should preferably be less volatile or vaporizable than the active anesthetic agent and it should prevent crystallization or deposition of the active anesthetic agent, particularly when the active anesthetic agent is forced through a thin capillary passage in the form of a spray by the pressure created by the ethyl chloride vapors inside of an ethyl chloride tube. These ethyl chloride tubes usually consist of sealed, elongated, glass vessels containing the ethyl chloride, which vessels at one end are provided with thin capillary orifices through which orifices the ethyl chloride will be ejected in the form of a spray by the vapor pressure of the ethyl chloride within the vessel.

Many other changes could be effected in the particular features of process treatment disclosed, and in specific details thereof, without substantially departing from the invention intended to be defined in the claim, the specific description herein merely serving to illustrate elements by which, in one embodiment, the spirit of the invention may be effectuated.

What is claimed is:

A non-precipitating, non-narcotic, non-alkaloidal, self spraying liquid, synthetic local anesthetic preparation, capable of being sprayed through a fine capillary orifice of a spray nozzle without deposition of anesthetic and without clogging, said preparation comprising a synthetic local anesthetic, dissolved in a mixture of a relatively small amount of benzyl alcohol and a relatively large amount of ethyl chloride, said local anesthetic being an organic compound selected from the group consisting of Alypin, Apothesine, Butyn, Diothane, Larocaine, Metycaine, Nupercaine-Ciba, Orthoform, Phenacaine, Procaine, Tutocain, Benzocaine, and Butesin and their borates, hydrochlorides and other salts.

JAMES G. BLASO.